(12) United States Patent
Nishimura

(10) Patent No.: US 11,752,629 B2
(45) Date of Patent: Sep. 12, 2023

(54) SCANNER CONTROLLER AND SCANNER CONTROL SYSTEM

(71) Applicant: Fanuc Corporation, Yamanashi (JP)

(72) Inventor: Ryuutarou Nishimura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 226 days.

(21) Appl. No.: 17/108,143

(22) Filed: Dec. 1, 2020

(65) Prior Publication Data

US 2021/0178592 A1 Jun. 17, 2021

(30) Foreign Application Priority Data

Dec. 16, 2019 (JP) ................................. 2019-226796

(51) Int. Cl.
*B25J 9/16* (2006.01)
*B23K 26/082* (2014.01)
*B23K 37/02* (2006.01)
*G05B 19/042* (2006.01)
*B25J 11/00* (2006.01)
*B23K 26/21* (2014.01)
*B25J 15/00* (2006.01)

(52) U.S. Cl.
CPC ........... *B25J 9/1671* (2013.01); *B23K 26/082* (2015.10); *B23K 37/0229* (2013.01); *B25J 9/1664* (2013.01); *B25J 9/1692* (2013.01); *B25J 11/005* (2013.01); *G05B 19/042* (2013.01); *B23K 26/21* (2015.10); *B25J 15/0019* (2013.01); *G05B 2219/39371* (2013.01)

(58) Field of Classification Search
CPC .. B23K 26/28; B23K 26/244; B23K 37/0229; B23K 26/22; B23K 26/082; B23K 26/21; B25J 11/005; B25J 9/1671; B25J 9/1692; B25J 9/1664; B25J 15/0019; G05B 19/042; G05B 2219/39371
See application file for complete search history.

(56) References Cited

U.S. PATENT DOCUMENTS 5,799,135 A * 8/1998 Terawaki ............... B25J 9/1679
700/258
8,716,622 B2 5/2014 Yoshikawa et al.
(Continued)

FOREIGN PATENT DOCUMENTS

JP 2007283402 A 11/2007
JP 2012139711 A * 7/2012 ........... B23K 26/082

*Primary Examiner* — Stephen Holwerda
(74) *Attorney, Agent, or Firm* — RatnerPrestia

(57) ABSTRACT

A scanner controller analyzes a position instruction in which a position in a world coordinate system and a position in a local coordinate system of a path of laser light are associated with each other and creates a movement command for a drive unit of a scanner based on the position of the local coordinate system. Further, the scanner controller calculates the current position of the scanner in the local coordinate system based on the position and attitude of a robot in the world coordinate system and the position in the world coordinate system in accordance with the position instruction. When the distance between the calculated position of the local coordinate system and the position in the local coordinate system in accordance with the position instruction is below a predetermined threshold, the scanner controller then determines to start machining and performs control of a drive unit of the scanner.

2 Claims, 6 Drawing Sheets

(56) References Cited

U.S. PATENT DOCUMENTS

| | | | |
|---|---|---|---|
| 2012/0255938 A1* | 10/2012 | Oe ..................... | B23K 26/0884 901/41 |
| 2018/0043471 A1* | 2/2018 | Aoki .................. | G05B 19/4083 |
| 2018/0333805 A1* | 11/2018 | Matsumoto ........ | B23K 26/0884 |

* cited by examiner

• DURING SIMULATION

• DURING ACTUAL MACHINING

SCANNER CONTROLLER AND SCANNER CONTROL SYSTEM

RELATED APPLICATIONS

The present application claims priority to Japanese Patent Application Number 2019-226796 filed Dec. 16, 2019, the disclosure of which is hereby incorporated by reference herein in its entirety.

BACKGROUND OF THE INVENTION

1. Field of the Invention

The present invention relates to a scanner controller and a scanner control system.

2. Description of the Related Art

A technology of irradiating a workpiece with a laser beam from a position distant from the workpiece to perform welding is called remote laser welding. A Galvano scanner is one of the schemes for controlling a machining path in remote laser welding. The Galvano scanner (hereafter, simply referred to as a scanner) is a device that scans an arbitrary path with laser light by operating one or more mirrors (for example, two mirrors when laser control in X and Y directions is performed) in an optical system for laser. A remote laser welding robot system in which such a scanner is attached to the end of a robot, that is, a hand portion of a robot has been put into practice (see FIG. 7). In a remote laser welding robot system, since a scanner is operated while a robot is being moved, welding can be performed on a more complex machining path than in a case where a scanner is operated alone. Such a machining scheme performed by operating a scanner while moving a robot is called on-the-fly.

Typically, a robot controller that controls a robot controls a motor of the robot based on a program of movement command for the robot. On the other hand, a scanner controller that controls a scanner controls a motor of the scanner and the output of laser based on a program in which irradiation positions of laser and output conditions (power) of the laser are described. In the remote laser welding robot system described above, a robot controller transmits data of the position and attitude of an operating robot to a scanner controller, and the scanner controller creates an actual machining path while taking the operation of the robot into consideration (see Japanese Patent Application Laid-Open No. 2007-283402). The respective programs are created as programs synchronized by a path creation device.

As described above, the controller which controls the scanner and the controller of the robot in which the scanner is attached to the hand portion are implemented as separate devices. Further, data of the position and attitude of the robot is transmitted and received between these separate controllers, and thereby the operation of the robot and the operation of the scanner are synchronized with each other. However, it is difficult for the scanner controller to accurately recognize the position and attitude of the robot all the time. To improve synchronousness of the position and attitude of the scanner controller and the robot, both the scanner and the robot are required to be stationary each other when execution of a program is started in the scanner controller.

SUMMARY OF THE INVENTION

Thus, there is a problem of inability of starting on-the-fly at an optional arbitrary position. With a function of on-the-fly, the scanner controller can control the scanner to emit laser light to a desired position on a workpiece. However, since the scanner controller is unable to always recognize what degree the current position of the robot is shifted from the ideal value, variation may occur in machining results. Further, over-travel (OT) of the scanner may be caused.

Thus, there is a demand for a mechanism that can synchronize a scanner and a robot with each other from an optional position.

When creating paths of a robot and a scanner, a path generation device provided in a scanner control system of the present invention performs a simulation of a scanner operation and, based on a simulation result, creates a program in which a world coordinates of a scanner path and local coordinates of the scanner are included in the same block. The scanner that has received such a program starts machining using an on-the-fly function when the local coordinate value calculated from the world coordinate value included in the program and the position of the robot enters a certain range with respect to the local coordinate value of the same block.

A scanner controller according to one aspect of the present invention is a scanner controller that controls a scanner attached to an end of a robot and configured to scan a predetermined path with laser light based on a scanner control program to machine a workpiece, and a block of a position instruction in which a position in a world coordinate system and a position in a local coordinate system of a path of the laser light are associated with each other is included in the scanner control program, and the scanner controller includes: a program analysis unit that analyzes the scanner control program and creates a movement command for a drive unit of the scanner based on a position in a local coordinate system instructed by the block; an interpolation unit that creates interpolation data for each interpolation cycle based on the movement command; a position calculation unit that calculates a current position of the scanner in a local coordinate system based on a position and attitude in the world coordinate system of the robot and a position in the world coordinate system instructed by the block; an on-the-fly start determination unit that determines to start machining using an on-the-fly function when a distance between a position in a local coordinate system calculated in the position calculation unit and a position in a local coordinate system instructed by the block is below a predetermined threshold defined in advance; and a motor output unit that performs control of the drive unit of the scanner based on interpolation data created by the interpolation unit when the on-the-fly start determination unit determines to start machining using an on-the-fly function.

A scanner control system according to another aspect of the present invention includes: a path creation device that performs a simulation based on a specified machining path and creates a robot control program and a scanner control program including a block of a position instruction in which a position in a world coordinate system and a position in a local coordinate system of a path of laser light are associated with each other; a robot controller that controls an operation of a robot based on the robot control program; and a scanner controller that controls a scanner attached to an end of the robot and configured to scan a predetermined path with laser light based on the scanner control program to machine a workpiece. The scanner controller further includes a program analysis unit that analyzes the scanner control program and creates a movement command for a drive unit of the scanner based on a position in a local coordinate system instructed by the block, an interpolation unit that creates interpolation data for each interpolation cycle based on the movement command, a position calculation unit that calculates a current position of the scanner in a local coordinate system based on a position and attitude in the world coordinate system of the robot and a position in the world coordinate system instructed by the block, an on-the-fly start determination unit that determines to start machining using an on-the-fly function when a distance between a position in a local coordinate system calculated in the position calculation unit and a position in a local coordinate system instructed by the block is below a predetermined threshold defined in advance, and a motor output unit that performs control of the drive unit of the scanner based on interpolation data created by the interpolation unit when the on-the-fly start determination unit determines to start machining using an on-the-fly function.

In the present invention, with the configuration described above, the scanner controller recognizes a displacement of the robot from an ideal position, and thereby synchronization of the on-the-fly function is no longer required to be started in a state where the scanner and the robot are stationary each other. Further, it is possible to switch a plurality of programs during the operation of the robot to perform machining using the on-the-fly function.

DETAILED DESCRIPTION OF THE PREFERRED EMBODIMENTS

Figure 1:
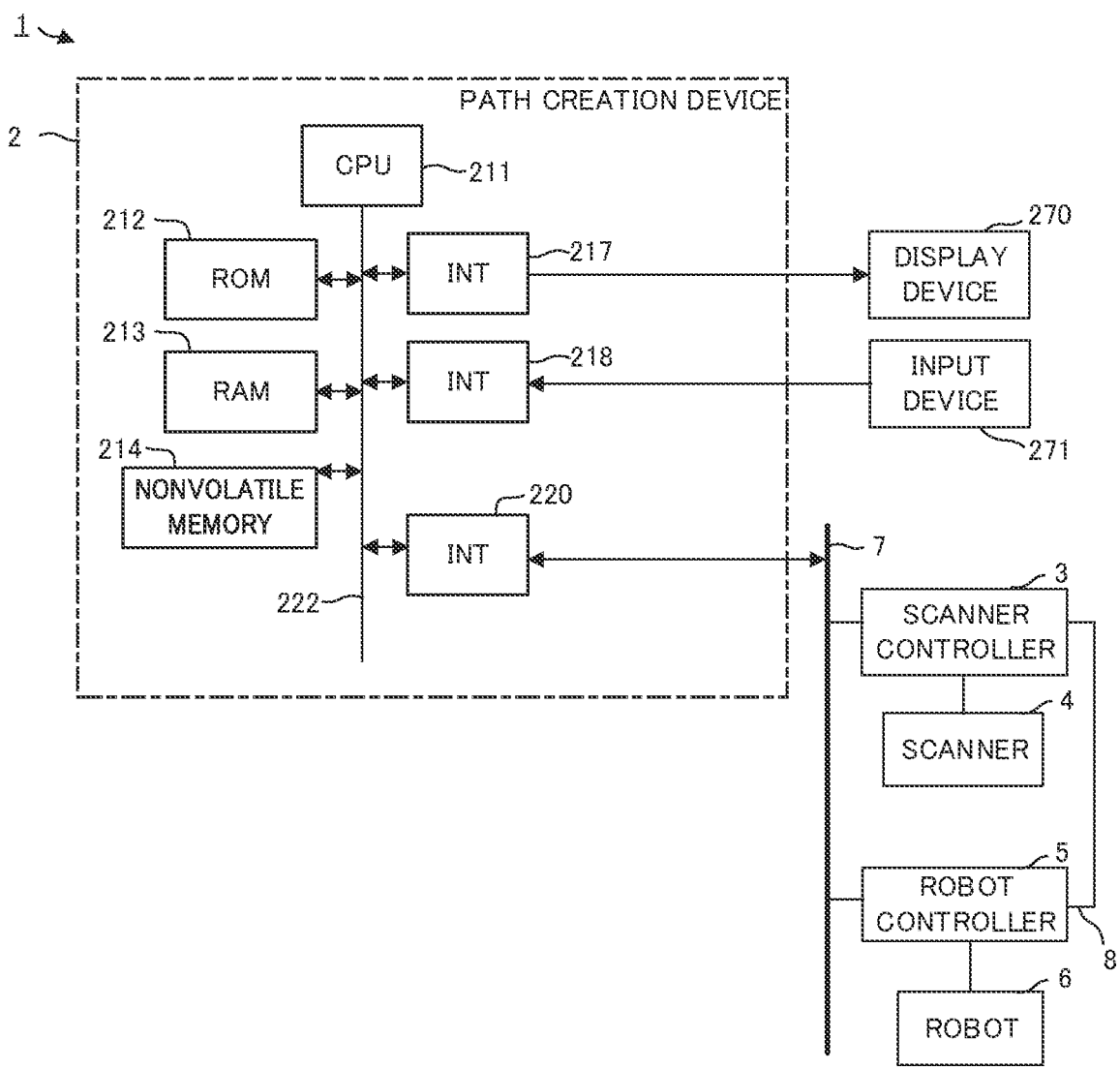
FIG. 1 is a schematic diagram of a hardware configuration of a path creation device provided in a scanner control system according to one embodiment.

FIG. 1 is a schematic diagram of a hardware configuration illustrating a primary part of a path creation device provided in a scanner control system according to one embodiment of the present invention.

A scanner control system 1 according to the present embodiment is configured such that a scanner controller 3 that controls a scanner 4, a robot controller 5 that controls a robot 6 in which the scanner 4 is attached to the end of a hand, and a path creation device 2 that creates a program used for instructing the scanner controller 3 and the robot controller 5 for motion paths are connected to each other via a wired or wireless network 7, for example.

The path creation device 2 provided in the scanner control system 1 can be mounted on a personal computer connected to the scanner controller 3 and the robot controller 5 via the network 7, for example. The CPU 211 provided in the path creation device 2 according to the present embodiment is a processor that generally controls the path creation device 2.

The CPU 211 reads a system program stored in a ROM 212 via a bus 222 and controls the overall path creation device 2 in accordance with the system program. A RAM 213 temporarily stores temporary calculated data or display data and various externally input data or the like.

A nonvolatile memory 214 is formed of a memory device, a solid state drive (SSD), or the like backed up by a battery (not illustrated), for example, and the storage state is held even when the path creation device 2 is powered off. The nonvolatile memory 214 stores data loaded from an external device (not illustrated), data input via an input device 271, data acquired from the scanner controller 3, the robot controller 5, or the like via an interface 220, or the like. The data stored in the nonvolatile memory 214 may be loaded into the RAM 213 when executed or used. Further, various system programs such as a known analysis program are written in advance in the ROM 212.

The interface 220 is an interface used for connecting the CPU 211 of the path creation device 2 to the wired or wireless network 7. The scanner controller 3, the robot controller 5, a fog computer, a cloud server, or the like are connected to the network 7 to transfer data to and from the path creation device 2.

On a display device 270, each data loaded on a memory device, data obtained as a result of execution of a program or the like, or the like are output and displayed via an interface 217. Further, the input device 271 formed of a keyboard, a pointing device, or the like passes an instruction, data, or the like based on a worker's operation to the CPU 211 via an interface 218.

Figure 2:
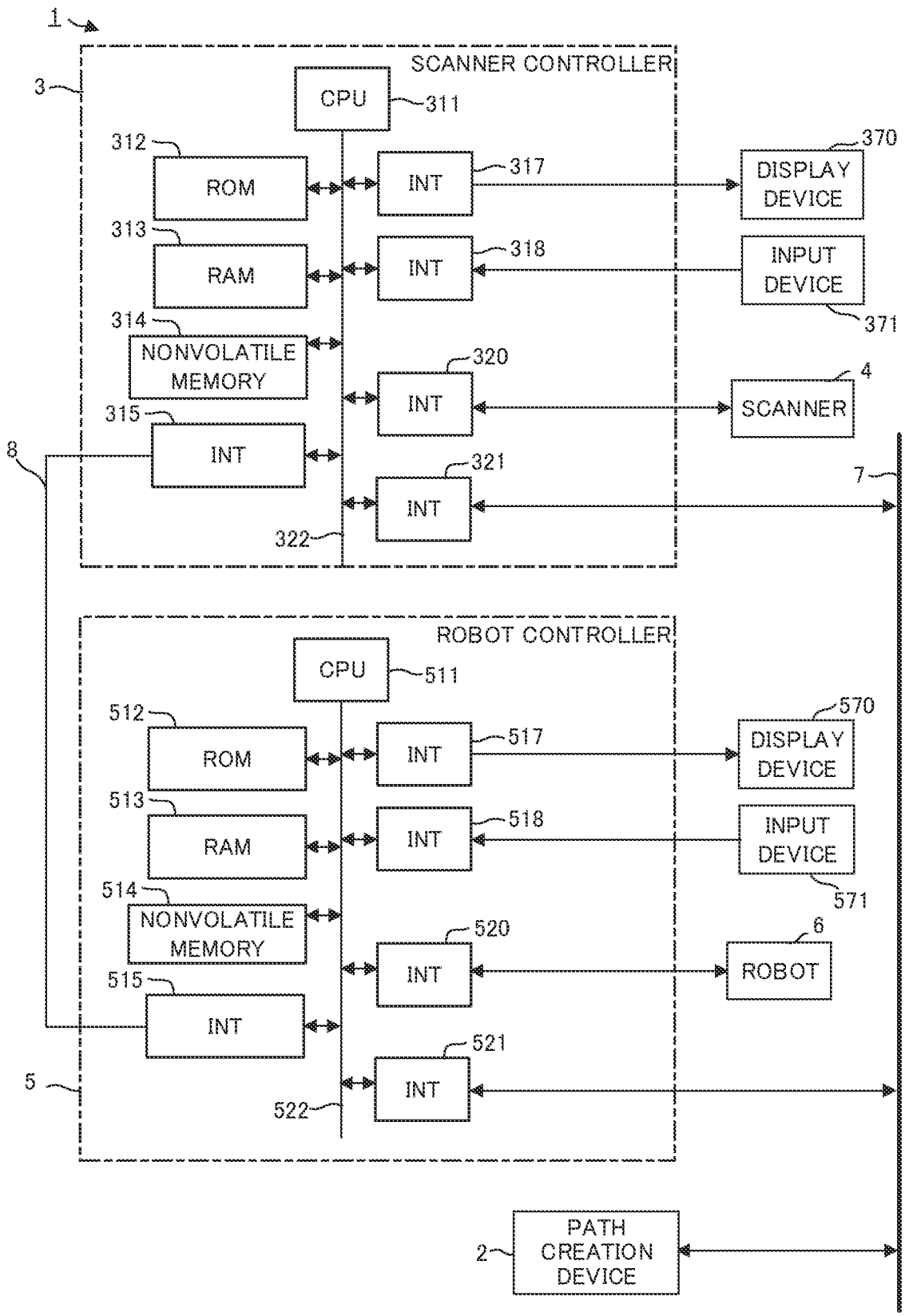
FIG. 2 is a schematic diagram of a hardware configuration of a scanner controller and a robot controller provided in the scanner control system according to one embodiment.

FIG. 2 is a schematic diagram of a hardware configuration illustrating primary parts of the scanner controller and the robot controller provided in the scanner control system according to one embodiment of the present invention.

A CPU 311 provided in the scanner controller 3 according to the present embodiment is a processor that generally controls the scanner controller 3. The CPU 311 reads a system program stored in a ROM 312 via a bus 322 and controls the overall scanner controller 3 in accordance with the system program. A RAM 313 temporarily stores temporary calculated data or display data and various externally input data or the like.

A nonvolatile memory 314 is formed of a memory device, a solid state drive (SSD), or the like backed up by a battery (not illustrated), for example, and the storage state is held even when the scanner controller 3 is powered off. The nonvolatile memory 314 stores data loaded from an external device (not illustrated), data input via an input device 371, data acquired from the path creation device 2 or the like via an interface 321, data acquired from the robot controller 5 via an interface 315, or the like. The data stored in the nonvolatile memory 314 may be loaded into the RAM 313 when executed or used. Further, various system programs such as a known analysis program are written in advance in the ROM 312.

The scanner controller 3 is connected to the scanner 4 via an interface 320. The CPU 311 executes a program acquired from the path creation device 2, for example, and outputs an instruction to control a motor provided in the scanner 4 or an instruction to control a laser oscillator (not illustrated) via the interface 320. Further, the CPU 311 acquires data related to the operation status of the scanner 4 via the interface 320.

The interface 321 is an interface used for connecting the CPU 311 of the scanner controller 3 to the wired or wireless network 7. The path creation device 2, the robot controller 5, a fog computer, a cloud server, or the like are connected to the network 7 and transfer data to and from the scanner controller 3.

On a display device 370, each data loaded on a memory device, data obtained as a result of execution of a program or the like, or the like are output and displayed via an interface 317. Further, the input device 371 formed of a keyboard, a pointing device, or the like passes an instruction, data, or the like based on a worker's operation to the CPU 311 via an interface 318.

The CPU 511 provided in the robot controller 5 according to the present embodiment is a processor that generally controls the robot controller 5. The CPU 511 reads a system program stored in a ROM 512 via a bus 522 and controls the overall robot controller 5 in accordance with the system program. A RAM 513 temporarily stores temporary calculated data or display data and various externally input data or the like.

A nonvolatile memory 514 is formed of a memory device, a solid state drive (SSD), or the like backed up by a battery (not illustrated), for example, and the storage state is held even when the robot controller 5 is powered off. The nonvolatile memory 514 stores data loaded from an external device (not illustrated), data input via an input device 571, data acquired from the path creation device 2 or the like via an interface 521, data acquired from the scanner controller 3 via an interface 515, or the like. The data stored in the nonvolatile memory 514 may be loaded into the RAM 513 when executed or used. Further, various system programs such as a known analysis program are written in advance in the ROM 512.

The robot controller 5 is connected to the robot 6 via an interface 520. The CPU 511 executes a program acquired from the path creation device 2, for example, and outputs an instruction to control a motor that drives each axis of the robot 6 via the interface 520. Further, the CPU 511 acquires data related to the operation status of the robot 6 via the interface 520.

The interface 521 is an interface used for connecting the CPU 511 of the robot controller 5 to the wired or wireless network 7. The path creation device 2, the scanner controller 3, a fog computer, a cloud server, or the like are connected to the network 7 and transfer data to and from the robot controller 5.

On a display device 570, each data loaded on a memory device, data obtained as a result of execution of a program or the like, or the like are output and displayed via an interface 517. Further, the input device 571 formed of a keyboard, a pointing device, or the like passes an instruction, data, or the like based on a worker's operation to the CPU 511 via an interface 518.

The scanner controller 3 and the robot controller 5 may be connected to a communication line 8 that is different from and faster than the network 7. For example, the robot controller 5 can transmit data related to the position and attitude of the robot 6 to the scanner controller 3 at a high speed via the communication line 8.

Figure 3:
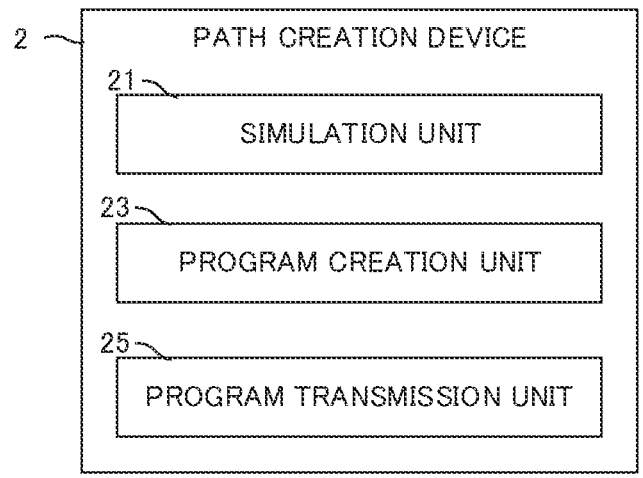
FIG. 3 is a block diagram illustrating a general function of the path creation device according to one embodiment.

FIG. 3 illustrates the function of the path creation device 2 provided in the scanner control system 1 according to the first embodiment of the present invention as a schematic block diagram.

Each function of the path creation device 2 according to the present embodiment is implemented when the CPU provided in the path creation device 2 illustrated in FIG. 1 executes the system program and controls the operation of each unit of the path creation device 2.

The path creation device 2 of the present embodiment has a simulation unit 21, a program creation unit 23, and a program transmission unit 25.

The simulation unit 21 is implemented when the CPU 211 provided in the path creation device 2 illustrated in FIG. 1 executes a system program read from the ROM 212 and an operation process using the RAM 213 or the nonvolatile memory 214 is performed mainly by the CPU 211. The simulation unit 21 performs a simulation process based on a machining path input by an operator via the input device 271, for example. The simulation process performed by the simulation unit 21 is to perform teaching and operation of the robot by moving the robot in robot work in a virtual space and create an instruction capable of avoiding an obstacle or the like.

The simulation unit 21 links an irradiation position in the world coordinate system instructed by a machining path with an irradiation position in the local coordinate system on which the scanner actually operates. The simulation unit 21 simulates change in the position and attitude of the robot 6 (operation path) for machining a part on the machining path based on the input machining path. Further, the simulation unit 21 simulates change in the position of each motor of the scanner 4 (operation path) for emitting laser to a position on a machining path on a workpiece from the scanner 4 when the position and attitude of the robot 6 is changing. A simulation result from the simulation unit 21 is output to the program creation unit 23.

The program creation unit 23 is implemented when the CPU 211 provided in the path creation device 2 illustrated in FIG. 1 executes a system program read from the ROM 212 and an operation process using the RAM 213 or the nonvolatile memory 214 is performed mainly by the CPU 211. The program creation unit 23 calculates an operation path of the robot 6 in the world coordinate system (for example, a coordinate system in which the origin of the robot 6 is the reference position) based on a result of a simulation process performed by the simulation unit 21. Further, the program creation unit 23 calculates an operation path of the scanner 4 in the world coordinate system and an operation path of the scanner 4 in the local coordinate system of the scanner 4 (for example, a coordinate system in which the origin of the scanner 4 is the reference position) based on a result of a simulation process performed by the simulation unit 21. Further, the program creation unit 23 creates a robot control program that operates the robot 6 and a scanner control program that operates the scanner 4, respectively, based on each calculated operation path.

The robot control program created by the program creation unit 23 includes a block for an instruction for an operation path of the robot 6 in the world coordinate system. Further, the scanner control program created by the program creation unit 23 includes a block for an instruction in which an operation path of the scanner in the world coordinate system and an operation path of the scanner in the local coordinate system are associated with each other.

The program transmission unit 25 is implemented when the CPU 211 provided in the path creation device 2 illustrated in FIG. 1 executes a system program read from the ROM 212 and an operation process using the RAM 213 or the nonvolatile memory 214 and a communication process using the interface 220 are performed mainly by the CPU 211. The program transmission unit 25 transmits a robot control program created by the program creation unit 23 to the robot controller 5. Further, the program transmission unit 25 transmits a scanner control program created by the program creation unit 23 to the scanner controller 3.

Figure 4:
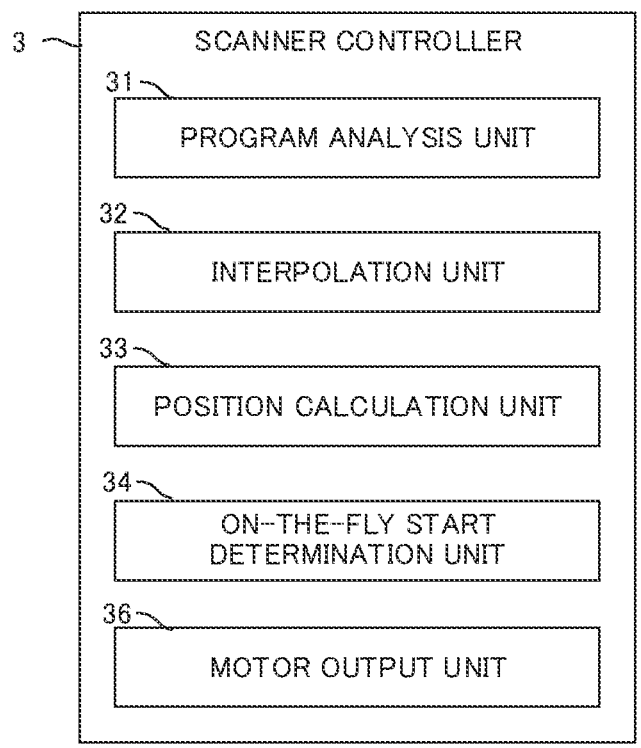
FIG. 4 is a block diagram illustrating a general function of the scanner controller according to one embodiment.

FIG. 4 illustrates the function of the scanner controller 3 provided in the scanner control system 1 according to the first embodiment of the present invention as a schematic block diagram.

Each function of the scanner controller 3 according to the present embodiment is implemented when the CPU provided in the scanner controller 3 illustrated in FIG. 2 executes the system program and controls the operation of each unit of the scanner controller 3.

The scanner controller 3 of the present embodiment has a program analysis unit 31, an interpolation unit 32, a position calculation unit 33, an on-the-fly start determination unit 34, and a motor output unit 36.

The program analysis unit 31 is implemented when the CPU 311 provided in the scanner controller 3 illustrated in FIG. 2 executes a system program read from the ROM 312 and an operation process using the RAM 313 or the nonvolatile memory 314 is performed mainly by the CPU 311. The program analysis unit 31 analyzes each block of a scanner control program created by the path creation device 2 and calculates an operation path of the scanner 4. The program analysis unit 31 creates a movement command for a drive unit of the scanner 4 (a movement command for a laser irradiation position in the local coordinate system) based on the operation path of the scanner 4 in the local coordinate system instructed by the scanner control program.

The interpolation unit 32 is implemented when the CPU 311 provided in the scanner controller 3 illustrated in FIG. 2 executes a system program read from the ROM 312 and an operation process using the RAM 313 or the nonvolatile memory 314 is performed mainly by the CPU 311. The interpolation unit 32 creates interpolation data indicating a motion amount for each interpolation cycle of each motor that drives the drive unit of the scanner 4 based on a movement command for the drive unit of the scanner 4 created by the program analysis unit 31.

The position calculation unit 33 is implemented when the CPU 311 provided in the scanner controller 3 illustrated in FIG. 2 executes a system program read from the ROM 312 and an operation process using the RAM 313 or the nonvolatile memory 314 and a communication process using the interface 315 are performed mainly by the CPU 311. The position calculation unit 33 receives data of a position and attitude of the robot 6 in the world coordinate system transmitted from the robot controller 5 via the communication line 8 and calculates the position of the scanner 4 in the local coordinate system based on the received data of the position and attitude of the robot 6 and the position in the world coordinate system instructed from the scanner control program analyzed by the program analysis unit 31.

Figure 8:
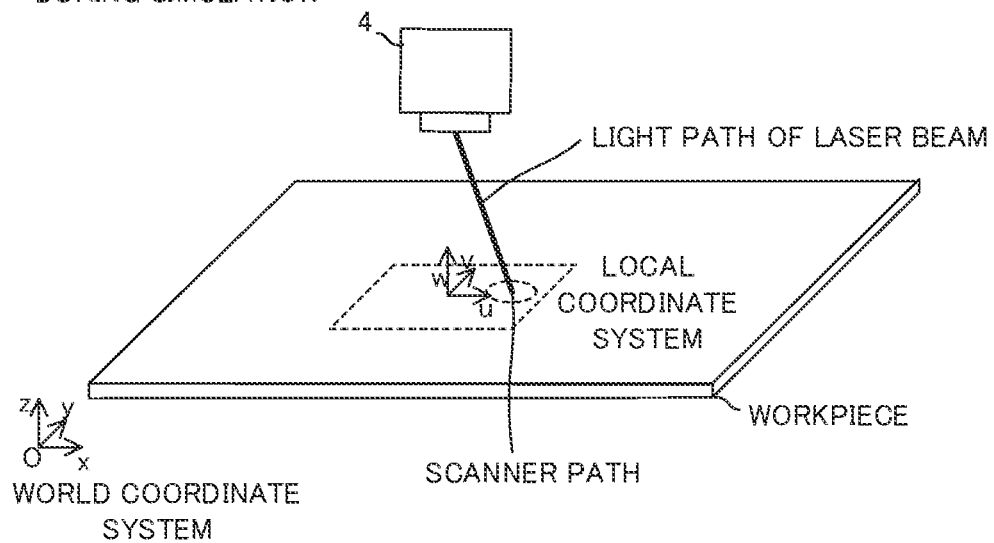
FIG. 8 is a diagram illustrating an operation of an on-the-fly start determination unit.
Figure 8:
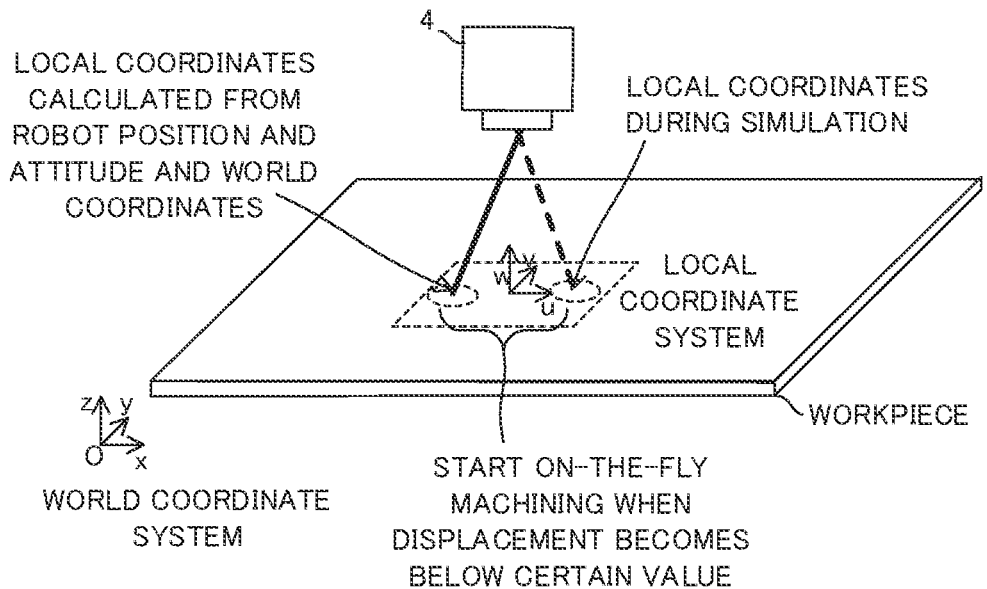

The on-the-fly start determination unit 34 is implemented when the CPU 311 provided in the scanner controller 3 illustrated in FIG. 2 executes a system program read from the ROM 312 and an operation process using the RAM 313 or the nonvolatile memory 314 is performed mainly by the CPU 311. As illustrated in FIG. 8 as an example, the on-the-fly start determination unit 34 determines to start machining of a workpiece using the on-the-fly function when the distance between the position of the scanner 4 in the local coordinate system calculated by the position calculation unit 33 and the start position in a movement command in the local coordinate system analyzed by the program analysis unit 31 becomes below a predetermined threshold defined in advance.

The motor output unit 36 is implemented when the CPU 311 provided in the scanner controller 3 illustrated in FIG. 2 executes a system program read from the ROM 312 and an operation process using the RAM 313 or the nonvolatile memory 314 and an input/output process using the interface 320 are performed mainly by the CPU 311. Once start of machining of a workpiece using the on-the-fly function is determined by the on-the-fly start determination unit 34, the motor output unit 36 outputs interpolation data created by the interpolation unit 32 to each motor that drives the drive unit of the scanner 4 and performs drive control of the motor.

Figure 5:
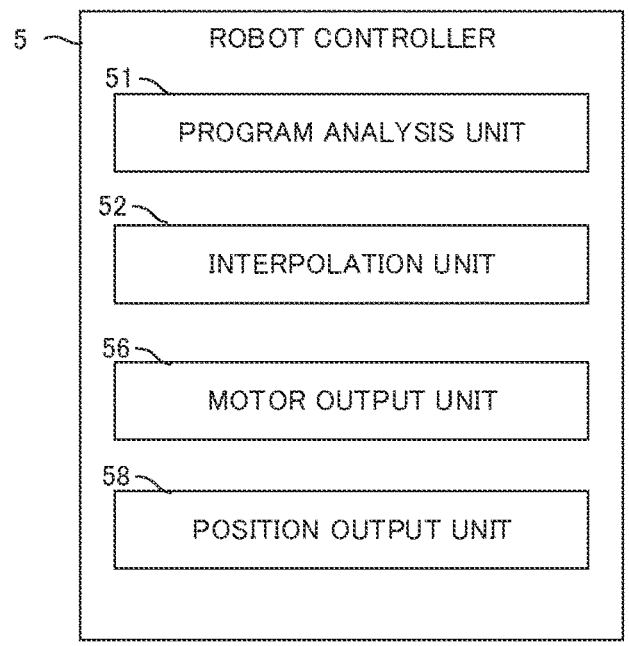
FIG. 5 is a block diagram illustrating a general function of a robot controller according to one embodiment.

FIG. 5 illustrates the function of the robot controller 5 provided in the scanner control system 1 according to the first embodiment of the present invention as a schematic block diagram.

Each function of the robot controller 5 according to the present embodiment is implemented when the CPU provided in the robot controller 5 illustrated in FIG. 2 executes the system program and controls the operation of each unit of the robot controller 5.

The robot controller 5 of the present embodiment has a program analysis unit 51, an interpolation unit 52, a motor output unit 56, and a position output unit 58.

The program analysis unit 51 is implemented when the CPU 511 provided in the robot controller 5 illustrated in FIG. 2 executes a system program read from the ROM 512 and an operation process using the RAM 513 or the nonvolatile memory 514 is performed mainly by the CPU 511. The program analysis unit 51 analyzes each block of a robot control program created by the path creation device 2 and calculates the operation path of the robot 6.

The interpolation unit 52 is implemented when the CPU 511 provided in the robot controller 5 illustrated in FIG. 2 executes a system program read from the ROM 512 and an operation process using the RAM 513 or the nonvolatile memory 514 is performed mainly by the CPU 511. The interpolation unit 52 creates interpolation data indicating a motion amount for each interpolation cycle of each motor that drives an axis of the robot 6 based on a movement command for the drive unit of the robot 6 created by the program analysis unit 51.

The motor output unit 56 is implemented when the CPU 511 provided in the robot controller 5 illustrated in FIG. 2 executes a system program read from the ROM 512 and an operation process using the RAM 513 or the nonvolatile memory 514 and an input/output process using the interface 520 are performed mainly by the CPU 511. The motor output unit 56 outputs interpolation data created by the interpolation unit 52 to each motor that drives the shaft of the robot 6 and performs drive control of the motor.

The position output unit 58 is implemented when the CPU 511 provided in the robot controller 5 illustrated in FIG. 2 executes a system program read from the ROM 512 and an operation process using the RAM 513 or the nonvolatile memory 514 and an input/output process using the interface 515 are performed mainly by the CPU 511. The position output unit 58 creates data related to the current position and attitude in the world coordinate system of the robot based on interpolation data (position instruction) output from the motor output unit 56 to each motor that drives an axis of the robot 6 or position information fed back from each motor and outputs the created data related to the position and attitude to the scanner controller 3.

In the scanner control system 1 having the configuration described above, the scanner control program that operates the scanner 4 created by the path creation device 2 includes a block in which the position in the world coordinate system and the position in the local coordinate system of the scanner 4 are associated with each other. While the robot controller 5 controls the operation of the robot 6 in accordance with the robot control program, the scanner controller 3 waits execution of the program until the position and attitude of the robot 6 approaches a predetermined machining start position instructed by the scanner control program. When the position and attitude of the robot 6 then approaches the machining start position, execution of the scanner control program is started, and machining of a workpiece is started. The difference between data related to the position and attitude of the robot 6 and the coordinate position instructed by the scanner control program indicates a displacement from an ideal position of the robot 6 assumed by the scanner controller 3, and with knowledge of such a displacement, synchronization of the on-the-fly function is no longer required to be started in a state where the scanner and the robot are stationary each other.

Figure 6:
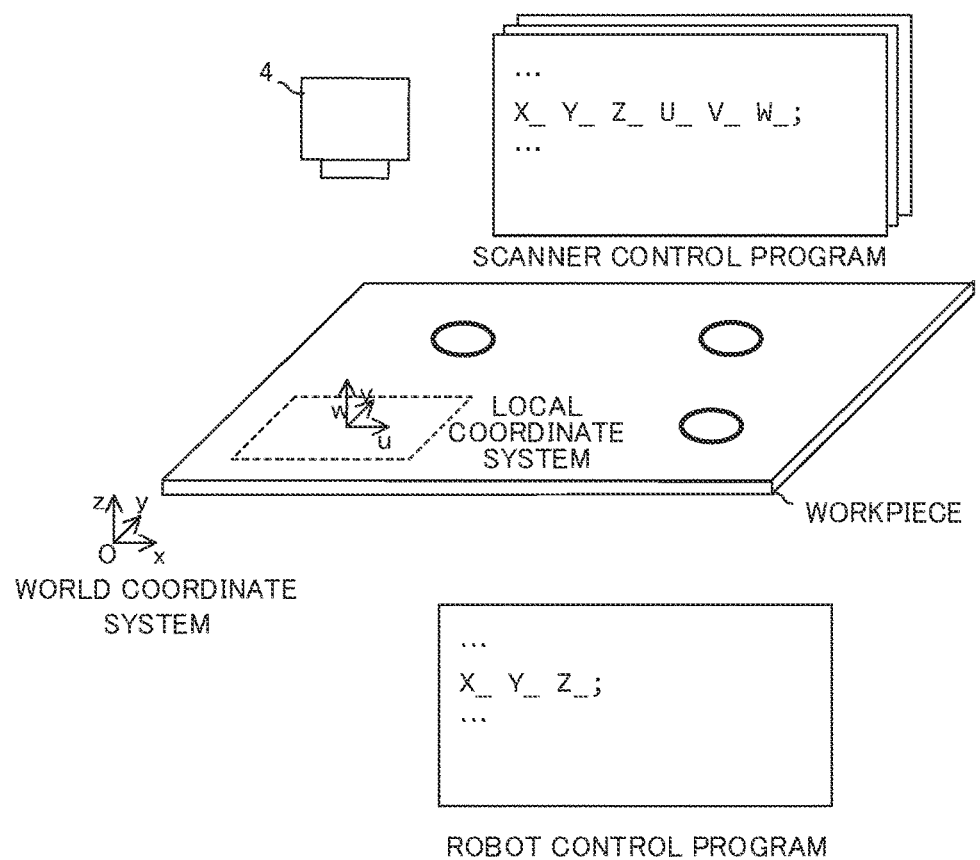
FIG. 6 is a diagram illustrating an example of machining using a plurality of scanner control programs.
Figure 7:
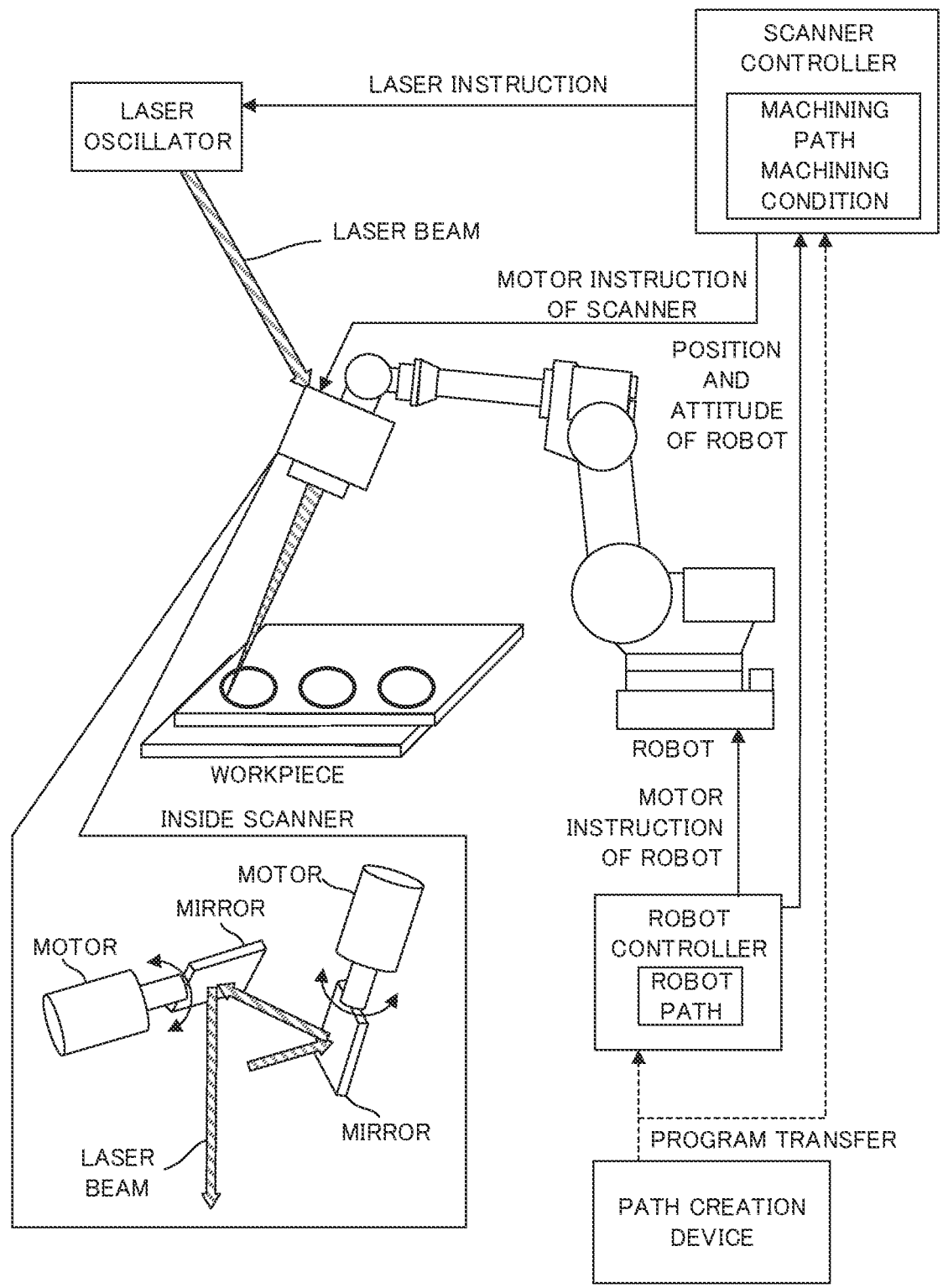
FIG. 7 is a diagram illustrating on-the-fly machining according to the related art.

In scanner control system 1 having the configuration described above, only the operation of the scanner 4 near the machining position of a workpiece is required to be created as a scanner control program. Thus, as illustrated in FIG. 6 as an example, a plurality of scanner control programs indicating the operation of the scanner 4 near the machining position of a workpiece can be prepared for a single robot control program and stored in the scanner controller 3, and when the position and attitude of the robot 6 approaches respective machining start positions, the scanner control programs at respective positions can be executed to perform machining. In such a way, scanner control programs in a series of machining can be created for each machining position, and thus enables flexible adaptation, for example, only some of the scanner control programs may be replaced as needed (for example, when some of the machining positions have a problem, or when the machining shape is intended to be changed for some of the machining positions, or the like).

As described above, although one embodiment of the present invention has been described, the present invention is not limited to only the examples in the embodiment described above and may be implemented in various forms with addition of an appropriate change.

The invention claimed is:

1. A scanner controller that controls a scanner attached to an end of a robot and configured to scan a predetermined path with laser light based on a scanner control program to machine a workpiece,
wherein, during a simulation, a block of a position instruction in which an operation path of the laser light of the scanner in a world coordinate system and an operation path of the laser light of the scanner in the local coordinate system of a path of the laser light are associated with each other is included in the scanner control program,
the scanner controller comprising:
a processor configured to:
analyze each block of the scanner control program and create a movement command of a laser irradiation position for a drive unit of the scanner based on the operation path of the local coordinate system instructed by the block of the scanner control program;
create interpolation data indicating a motion amount for each interpolation cycle of each motor that drives the drive unit of the scanner based on the created movement command for the drive unit of the scanner;
calculate a current position of the scanner in the local coordinate system based on received data of position and attitude of the robot in the world coordinate system and the position in the world coordinate system instructed by the block;
during an actual machining, determine to start machining the workpiece using an on-the-fly function when a distance between the calculated position of the scanner in the local coordinate system and a start position in the created movement command in the local coordinate system is below a predetermined threshold for an approach of the robot to the start position defined in advance; and
control an operation of the motor of the drive unit of the scanner in accordance with the created interpolation data and the determined start of the machining of the workpiece when the distance is below the predetermined threshold for the approach of the robot to the start position in the created movement command for the drive unit.

2. A scanner control system comprising:
a path creation device that performs a simulation based on a specified machining path and creates a robot control program and a scanner control program to machine a workpiece, wherein, during the simulation, a block of a position instruction in which an operation path of a laser light of a scanner in a world coordinate system and a position in aan operation path of the laser light of the scanner in the local coordinate system are associated with each other and included in the scanner control program;
a robot controller that controls an operation of a robot based on the robot control program; and
a scanner controller that controls the scanner attached to an end of the robot and configured to scan a predetermined path with laser light based on the scanner control program to machine a workpiece,
wherein the scanner controller includes a processor configured to:
analyze each block of the scanner control program and create a movement command of a laser irradiation position for a drive unit of the scanner based on the operation path of the local coordinate system instructed by the block of the scanner control program,
create interpolation data indicating a motion amount for each interpolation cycle of each motor that drives the drive unit of the scanner based on the created movement command for the drive unit of the scanner,
calculate a current position of the scanner in the local coordinate system based on received data of position and attitude of the robot in the world coordinate system and the position in the world coordinate system instructed by the block,
during an actual machining, determine to start machining the workpiece using an on-the-fly function when a distance between the calculated position of the scanner in the local coordinate system and a start position in the created movement command in the local coordinate system is below a predetermined threshold for an approach of the robot to the start position defined in advance, and
control an operation of the motor of the drive unit of the scanner in accordance with the created interpolation data and the determined start of the machining of the workpiece when the distance is below the predetermined threshold for the approach of the robot to the start position in the created movement command for the drive unit.

* * * * *